`US008063367B2`

(12) United States Patent
Johnson et al.

(10) Patent No.: US 8,063,367 B2
(45) Date of Patent: Nov. 22, 2011

(54) LENS POSITION SENSOR FOR INFRARED CAMERAS

(75) Inventors: Kirk R. Johnson, Rogers, MN (US); Justin M. Sheard, Rogers, MN (US)

(73) Assignee: Fluke Corporation, Everett, WA (US)

( * ) Notice: Subject to any disclaimer, the term of this patent is extended or adjusted under 35 U.S.C. 154(b) by 174 days.

(21) Appl. No.: 12/428,844

(22) Filed: Apr. 23, 2009

(65) Prior Publication Data

US 2010/0270469 A1  Oct. 28, 2010

(51) Int. Cl.
  *G01J 5/08* (2006.01)
  *G01B 7/30* (2006.01)
(52) U.S. Cl. .................................. 250/330; 324/207.25
(58) Field of Classification Search ............. 324/207.25; 250/330
  See application file for complete search history.

(56) References Cited

U.S. PATENT DOCUMENTS

| 5,061,952 | A | 10/1991 | Ogawa |
| 6,444,983 | B1 | 9/2002 | McManus et al. |
| 2006/0062560 | A1 | 3/2006 | Ito et al. |
| 2006/0289772 | A1 | 12/2006 | Johnson et al. |
| 2008/0100284 | A1* | 5/2008 | Dobler et al. .............. 324/207.2 |

FOREIGN PATENT DOCUMENTS

| WO | WO 2008071875 A2 * | 6/2008 |
| WO | 2008082008 A1 | 10/2008 |

OTHER PUBLICATIONS

EP Application No. 10250811.6, European Search Report dated Jul. 9, 2010, 7 pages.

* cited by examiner

*Primary Examiner* — Constantine Hannaher
(74) *Attorney, Agent, or Firm* — Fredrikson & Byron, P.A.

(57) ABSTRACT

A lens position sensor for infrared or other types of cameras, which is particularly useful in lens assemblies that have relatively limited axial travel between near field and far field lens focus positions. The camera includes a magnet or other stimulator coupled to a rotatable lens that extends within a magnet plane where the magnet plane is not normal to the optical axis of the lens. A magnetic or other sensor senses the position of the magnet, which is indicative of the lens position.

24 Claims, 9 Drawing Sheets

LENS POSITION SENSOR FOR INFRARED CAMERAS

TECHNICAL FIELD

The present disclosure pertains to lens position sensors for infrared cameras or other types of cameras.

BACKGROUND

Handheld thermal imaging cameras, for example, including microbolometer detectors to generate infrared images, are used in a variety of applications, which include the inspection of buildings and industrial equipment. Many state-of-the-art thermal imaging cameras have a relatively large amount of built-in functionality allowing a user to select a display from among a host of display options, so that the user may maximize his 'real time', or on site, comprehension of the thermal information collected by the camera.

As is known, infrared cameras generally employ a lens assembly working with a corresponding infrared focal plane array (FPA) to provide an image of a view in a particular axis. The operation of such cameras is generally as follows. Infrared energy is accepted via infrared optics, including the lens assembly, and directed onto the FPA of microbolometer infrared detector elements or pixels. Each pixel responds to the heat energy received by changing its resistance value. An infrared (or thermal) image can be formed by measuring the pixels' resistances—via applying a voltage to the pixels and measuring the resulting currents or applying current to the pixels and measuring the resulting voltages. A frame of image data may, for example, be generated by scanning all the rows and columns of the FPA. A dynamic thermal image (i.e., a video representation) can be generated by repeatedly scanning the FPA to form successive frames of data. Successive frames of thermal image data are generated by repeatedly scanning the rows of the FPA; such frames are produced at a rate sufficient to generate a video representation of the thermal image data.

Also as is known, the lens assembly often includes a stationary lens body mounted to a camera housing. The lens body supports a rotatable focus ring for focusing the lens. Rotation of ring within the lens body results in axial movement of the ring and the lens relative to the lens body, which remains stationary, due to the cam action of the lens body. Lens position sensors may be employed to determine the lens focus position. However, in some lens assembly designs, the focus changes from its minimum distance to its maximum distance over a very short axial translation. The short axial translation does not provide much axial translation over which lens position sensors may be used to measure the focus position. Accordingly, the resolution and therefore the accuracy of the lens position sensors in such instances may be compromised.

SUMMARY OF THE INVENTION

Certain embodiments of the invention provide an infrared camera with a lens position sensor that includes a housing, a focal plane array (FPA) package with an FPA, a lens assembly, a magnet, and a magnetic sensor. The lens assembly includes a rotatable lens that is positioned such that thermal scene data collected by the lens along its central optical axis is directed onto the FPA. The central optical axis defines a lens plane normal to the axis. The magnet is coupled to the lens such that it rotates and shifts axially with the lens. The magnet extends within a magnet plane and the magnet plane forms an angle greater than zero with the lens plane. The magnetic sensor senses the magnetic flux from the magnet to determine the lens position.

Certain embodiments of the invention provide a camera with a lens position sensor that includes a housing, a focal plane array (FPA), a lens assembly, a magnet, and a magnetic sensor. The lens assembly includes a lens that is positioned such that scene data collected by the lens along its central optical axis is directed onto the FPA. The central optical axis defines a lens plane normal to the axis. The lens is also rotatable between a far field position and a near field position. The magnet is coupled to the lens such that it rotates and shifts axially with the lens. The magnet extends within a magnet plane and the magnet plane forms an angle greater than zero with the lens plane. The magnetic sensor senses the proximity of the magnet to determine the lens position. The magnet is relatively closer to the magnetic sensor when the lens is in the far field position than when the lens is in the near field focus position. The proximity of the magnet to the magnetic sensor depends in part on the angle between the magnet plane and the lens plane.

Certain embodiments of the invention provide a camera with a lens position sensor that includes a housing, a focal plane array (FPA), a lens assembly, a field source, and a sensor. The lens assembly includes a lens that is positioned such that scene data collected by the lens along its central optical axis is directed onto the FPA. The central optical axis defines a lens plane normal to the axis. The lens is also rotatable between a far field position and a near field position. The field source is coupled and at least partially encircles the lens such that it rotates and shifts axially with the lens. The field source defines a field source plane and the field source plane forms an angle greater than zero with the lens plane. The sensor senses the proximity of the field source to determine the lens position. The field source is relatively closer to the sensor when the lens is in the far field position than when the lens is in the near field focus position. The proximity of the field source to the sensor depends in part on the angle between the field source plane and the lens plane.

BRIEF DESCRIPTION OF THE DRAWINGS

The following drawings are illustrative of particular embodiments of the invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the invention.

Embodiments of the present invention relate to an infrared (IR) camera with a lens position sensor. In some embodiments, the camera includes imaging capabilities, such as thermal imaging capabilities where the camera includes a thermal sensor that senses thermal or infrared radiation from a target scene. The thermal sensor may comprise an array of infrared detectors, such as a focal plane array (FPA) that sense a thermal image of the target scene. In some such camera embodiments, the IR camera includes a display for viewing the sensed thermal imagery. Moreover, in some such camera embodiments, the IR camera may include a storage mechanism such that the instrument functions as an infrared (IR) camera module that senses and stores the thermal imagery. The camera of the IR camera may also include a visible light (VL) sensor that senses VL electromagnetic radiation from a target scene. The sensor may comprise an array of VL detectors in order to sense a VL imagery of the target scene. The VL imagery may be displayed or stored as noted above for the IR imagery. Such display may be of the VL imagery, the IR imagery, or a blended version of both of such images.

Figure 1:
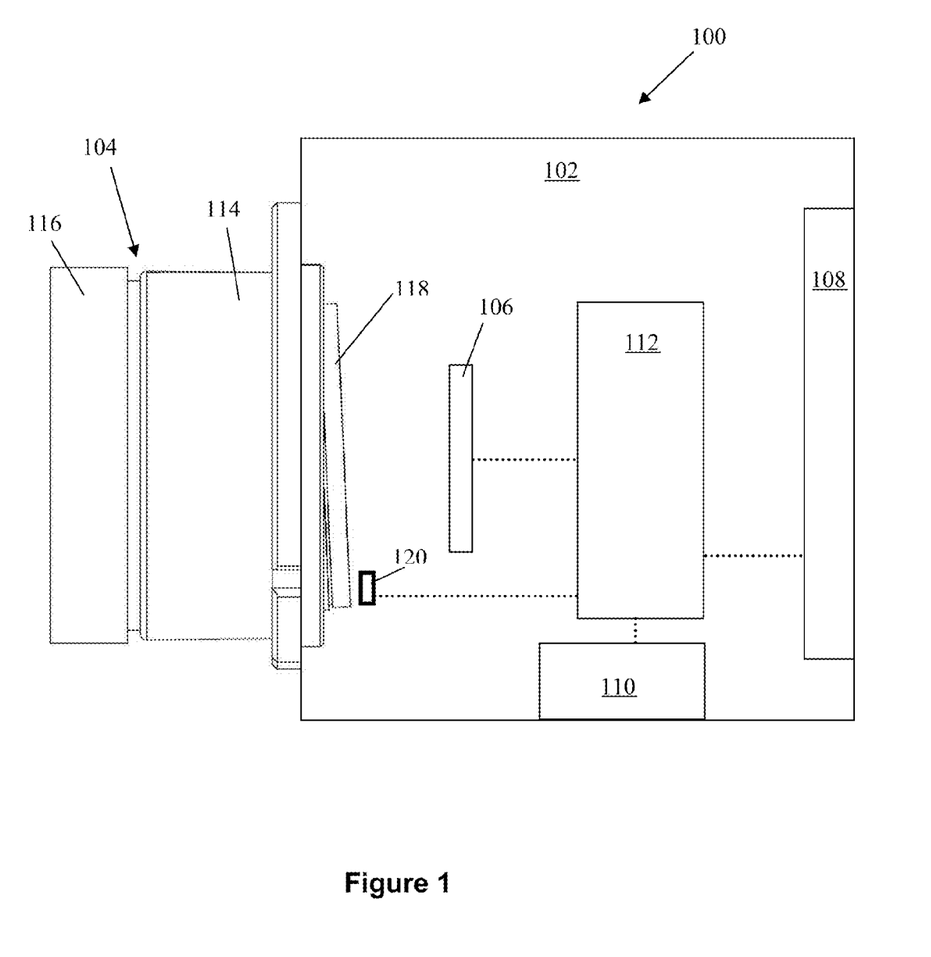
FIG. 1 is a schematic diagram of an infrared camera, according to some embodiments of the present invention.

FIG. 1 provides a schematic diagram of an IR camera 100 according to certain embodiments of the present invention. Camera 100 includes camera housing 102 that holds several components including an IR lens assembly 104 and an infrared sensor 106, such as a FPA of microbolometers. The housing 102 includes a display 108 and a user interface 110. The display 108 is used for displaying infrared image data and other information to the user. The user interface 110 contains various controls with which the user may control and operate the camera 100. The housing 102 also holds an electronic system 112 that controls camera operation and communicates, as shown by the dotted lines, with several of the camera 100 components.

The lens assembly 104 includes an IR lens for receiving a cone of IR energy from a target scene. The lens assembly also includes a stationary lens body 114 mounted to the housing 102. The lens body 114 supports a rotatable focus ring 116 for focusing the IR lens. Rotation of ring 116 within lens body 114 results in axial movement of ring 116 and IR lens relative to the lens body 114, which remains stationary. A magnet 118, which may be formed as a flat ring permanent magnet, is attached to the back of focus ring 116. Magnet 118 therefore rotates and translates axially with focus ring 116 when the IR lens is focused. As discussed further below, magnet 118 may be mounted at an angle that is not parallel to the plane of the IR lens. Magnet 118 works in conjunction with a magnetic sensor 120 that communicates with the camera electronic system 112. In some embodiments, magnet 118 comprises a permanent magnet and magnetic sensor 120 comprises a Hall effect sensor. However, other types of magnets and magnetic sensors may be employed, such as using reed switches and magnetoresistive sensors. Since the field of view of magnetic sensor 120 is positioned within the field of the magnet 118, magnetic sensor 120 can sense the position of magnet 118, which, in turn, may be used to determine the focus position. The IR lens focus position provides an especially convenient estimate of distance to target because typical infrared lenses have a low F-number, resulting in a shallow depth of field. Accordingly, camera 100 can determine the distance to target. Magnet 118 may not be an aperture stop that limits the amount of incoming IR radiation. Instead, the aperture in magnet 118 may be generally equal to the aperture in the rear of focus ring 116. However, in other embodiments, magnet 118 may function as an aperture stop.

Figure 2:
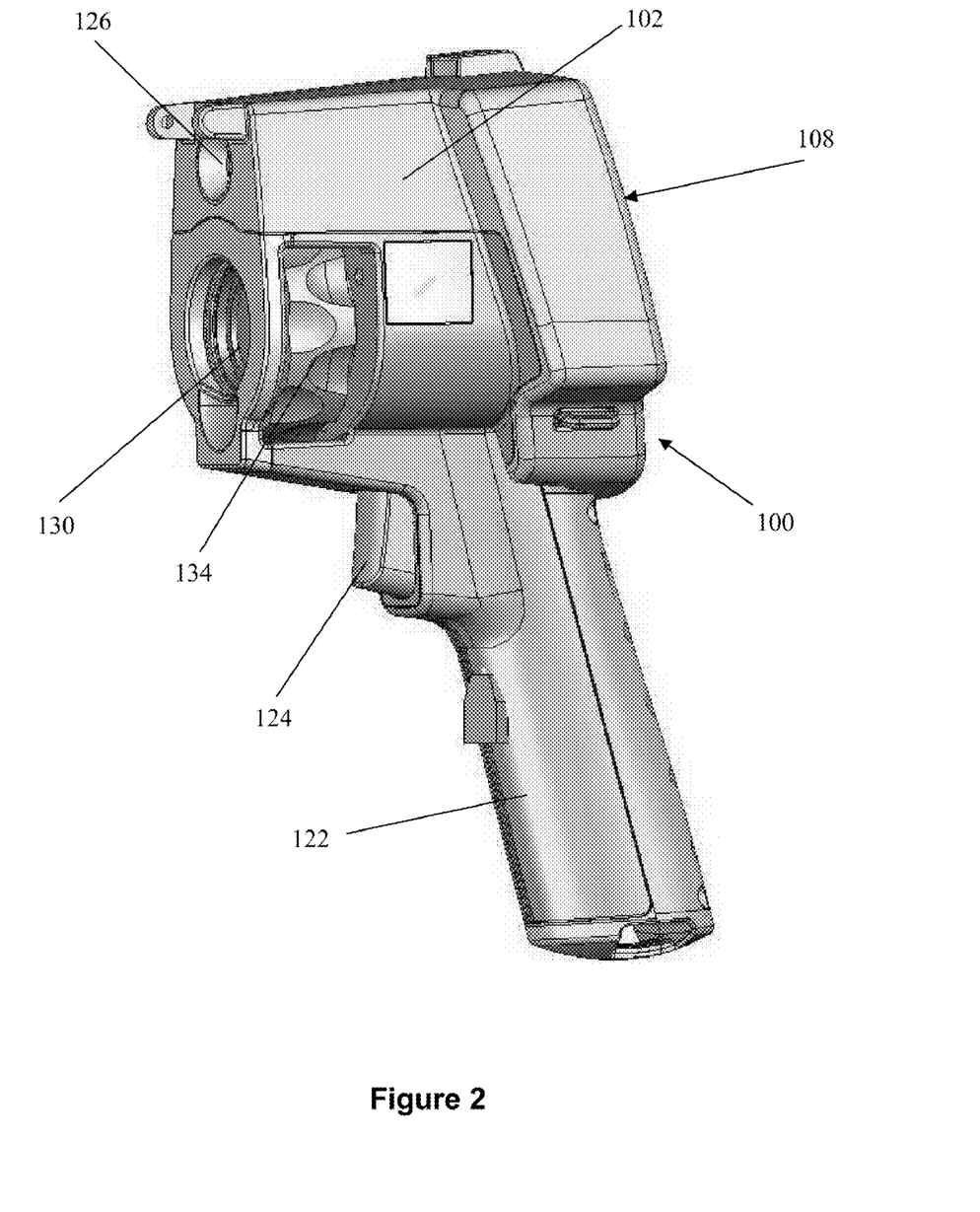
FIG. 2 is a front perspective view of an infrared camera, according to some embodiments of the present invention.

FIG. 2 shows a front perspective view of an infrared camera 100, according to some embodiments of the present invention. Like numbers denote like elements within other drawing figures. Camera 100 includes camera housing 102. An upper portion of housing 102 of camera 100 holds an engine assembly (FIG. 3) and the lower portion extends into a handle 122 for helping grasp camera 100 during use. The handle 122 includes a trigger 124 for image capture. A display 108 is located on the back of the instrument so that infrared images, visible light images, and/or blended images of infrared and visible light can be displayed to the user.

Figure 3:
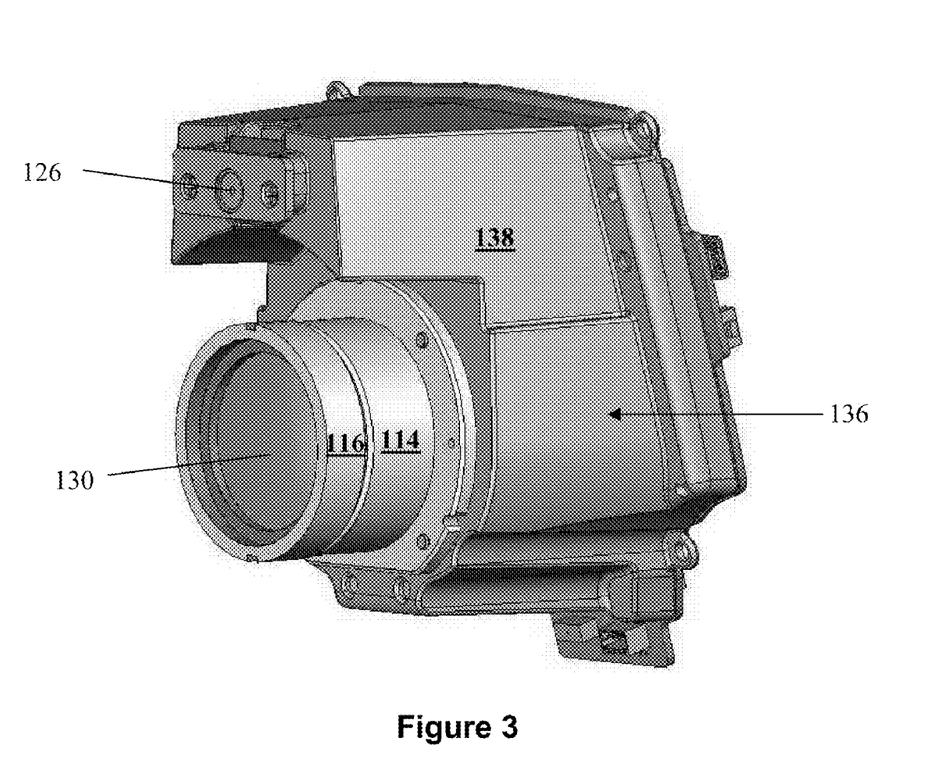
FIG. 3 is a front perspective view of an infrared engine assembly of an infrared camera, according to some embodiments of the present invention.

With reference to FIGS. 2 and 3, camera 100 contains both an IR camera module and a VL camera module supported by an engine housing 102.

Figure 5:
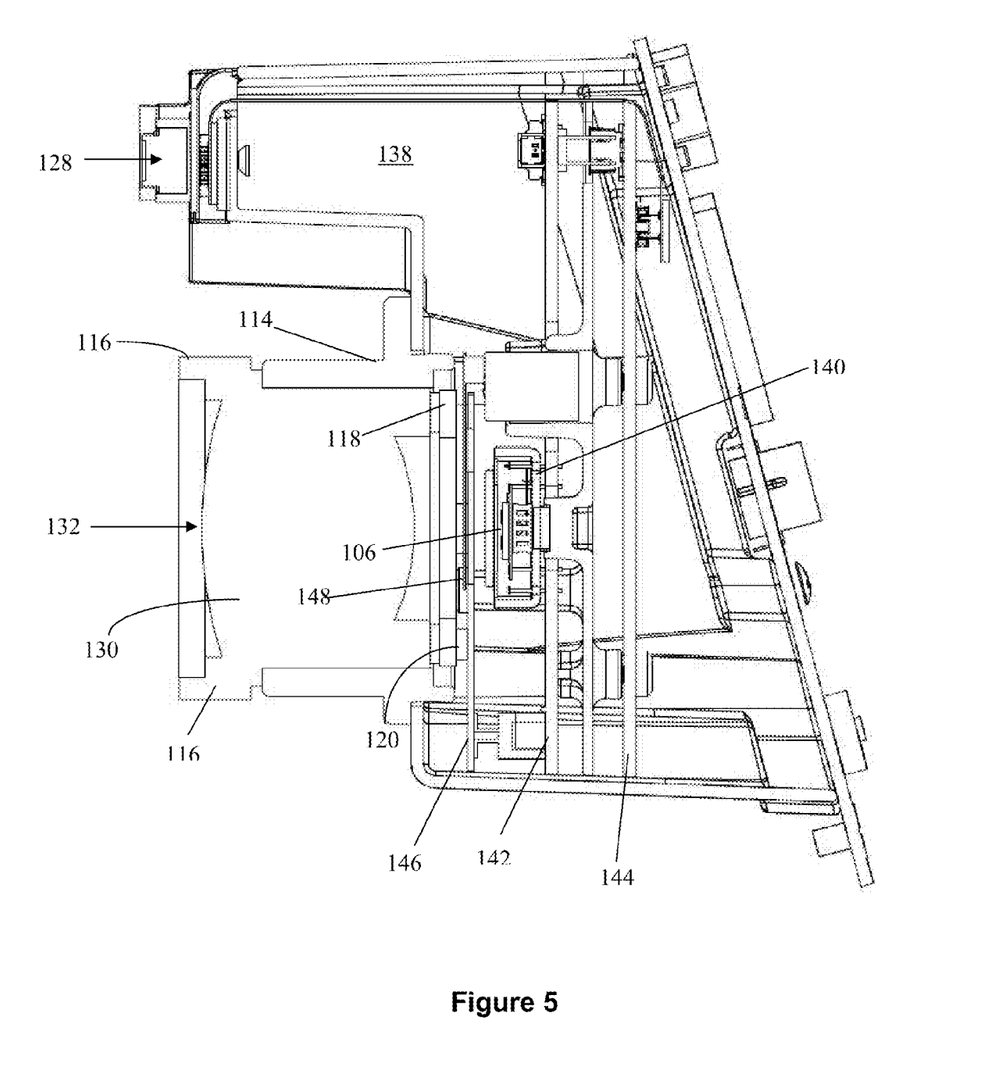
FIG. 5 is a cross-sectional view of the infrared camera engine assembly taken along line 5-5 of FIG. 4 with the visible light (VL) camera module removed.

The VL camera module, as noted above, is optional. The VL camera module includes a VL lens 126 for receiving a cone of VL energy from a target scene generally centered along input axis 128 (FIG. 5). The IR module includes an infrared (IR) lens 130, positioned below VL lens 126, for receiving a cone of IR energy from a target scene generally centered along input axis 132 (FIG. 5). The placement of the VL camera module and IR camera module is such that the visible and infrared optical axes 128, 132 are offset and roughly parallel to each other, thereby resulting in parallax error.

The parallax error may be corrected manually or electronically. For example, U.S. patent application Ser. No. 11/294,752, entitled "Visible Light and IR Combined Image Camera with a Laser Pointer," is incorporated herein in its entirety, discloses a parallax error correction architecture and methodology. This provides the capability to electronically correct the IR and VL images for parallax. In some embodiments, thermal instrument 100 includes the ability to determine the distance to target and contains electronics that correct the parallax error caused by the parallel optical paths using the distance to target information.

In certain embodiments, the visible light lens assembly is such that the visible light camera module remains in focus at all usable distances. Only the infrared lens needs focus adjustment for targets at different distances. The IR camera module includes a focusing assembly for focusing the IR lens 130. The IR lens 130 is part of a IR lens assembly 104. With reference to FIG. 2, the IR lens assembly may include a rotatable outer ring 134 having depressions to accommodate a tip of an index finger. Rotation of the outer ring 134 changes the focus of the IR lens 130. In the embodiments further described below, the IR camera module includes an internal electronic sensor, such as a Hall effect sensor, to determine the focus position of the IR lens assembly 104. The IR lens focus position provides an especially convenient estimate of distance to target because typical infrared lenses have a low F-number, resulting in a shallow depth of field. Accordingly, camera 100 can determine the distance to target.

Figure 4:
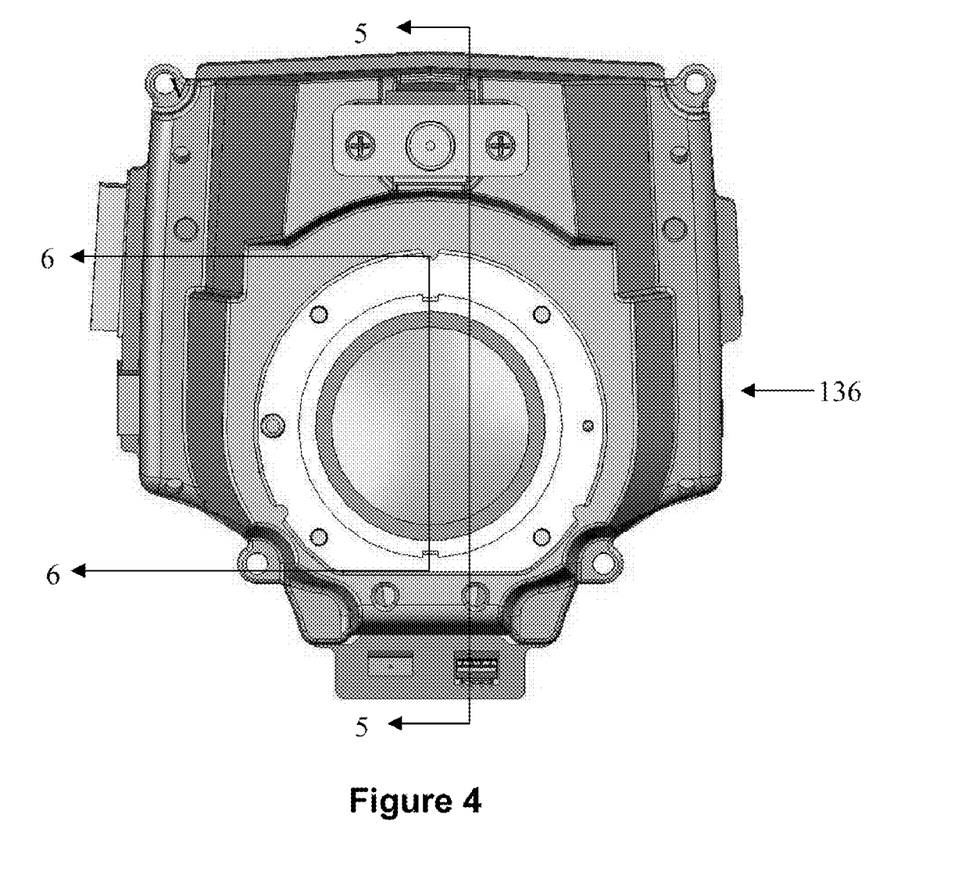
FIG. 4 is a front elevation view of the engine assembly shown in FIG. 3.

FIG. 3 is a front perspective view of an IR camera engine assembly 136 of an IR camera, according to some embodiments of the present invention, which is typically mounted within the camera housing. FIG. 4 is a front elevation view of the engine assembly 136 shown in FIG. 3.

As shown in FIG. 3, the engine 136 includes an engine housing 138 that supports the camera modules. The engine housing 138 may form the camera housing 102 or may be a separate housing inside the camera housing 102. A lens body 114 is mounted to the engine housing 138. Again, lens body 114 may instead be mounted to camera housing 102 or to both camera housing 102 and engine housing 138. The lens body 114 supports rotatable focus ring 116, which is coupled to outer ring 134 (FIG. 2) for focusing the IR lens 130. A rotation of outer ring 134 therefore also rotates inner ring 116 within lens body 114 and results in axial movement of outer ring 134, ring 116, and IR lens 130 relative to the lens body 114, which remains stationary.

FIG. 4 is a front elevation view of the thermal instrument engine 136 shown in FIG. 3, according to some embodiments. FIG. 5 is a cross-sectional view of the infrared camera engine assembly taken along line 5-5 of FIG. 4 with the visible light (VL) camera module removed.

FIG. 5 shows, in cross-section, the lens body 114 is mounted to the engine housing 138 to support the IR lens 130 and the rotatable focus ring 116, for focusing the IR lens 130. The rotatable focus ring 116 is coupled to the outer ring 134 (FIG. 2).

Also shown in FIG. 5 is a magnet 118 that is mounted to the IR lens assembly 104. Accordingly, when the IR lens 130 is focused, the magnet 118 translates axially with the focusable lens 130 in the lens assembly. Magnet 118 may be formed as a flat ring magnet with an aperture leading to the FPA that works in conjunction with a magnetic sensor to provide the approximate distance to target information. The distance to target information may be used for many purposes, including correction of parallax error. Although not shown in FIG. 5, the magnet may be angled relative to the plane of the lens.

In some embodiments, the VL module includes a visible light sensor formed of an array of detectors, such as CMOS, CCD or other types of visible-light detectors. In some embodiments, the array is 1280×1024 pixels (i.e., a 1.3 mega pixel camera). The VL camera module streams RGB image display data (e.g. 30 Hz) to an FPGA for combination with infrared RGB image data from the IR camera module and then sends the combined image data to the display 108. In some embodiments, the VL camera module is not included.

Embodiments of the IR camera module of the present invention also include an IR sensor. In certain embodiments, the IR sensor is formed of a focal plane array (FPA) of uncooled microbolometers. In some embodiments, the FPA is an array of 160 by 120 microbolometer detector elements or pixels. In other embodiments, the FPA size is 320 by 240 pixels. Other size arrays and other types of infrared detector elements besides microbolometers are within the scope of the present invention. In FIG. 5, the FPA 106 is housed and supported by an FPA package 140.

FIG. 5 also shows a stack of printed circuit board assemblies (PCAs) that contain some of the electronics that support the camera operation. As will be described further below, the stack of PCAs includes a first PCA 142, a second PCA 144, and a temperature sensor board (TSB) 146.

The TSB 146 is mounted in front of the first PCA 142 and in front of the FPA 106. TSB 146 includes an aperture that is located in front of an FPA window that leads to the FPA 106. TSB 146 may include several different sensors mounted on either side of the printed circuit board forming the TSB 146, such as magnetic sensor 120.

FIG. 5 more clearly show the relative position between the magnet 118 and the magnetic sensor 120. By mounting magnetic sensor 120 on the TSB 146, it may be situated very close to the magnet 118 in order to read the position of magnet 118 (e.g., the axial position of the IR lens 130). Magnetic sensor 120 may be mounted to either the front or back side of TSB 146. Alternatively, magnetic sensor 120 may be mounted elsewhere, as long as its field of view is in proximity to magnet 118. In addition, as is apparent from FIG. 5, a shutter 148 is positioned on the front side of TSB 146.

The first PCA 142 generally contains the analog electronics of the IR camera. The first PCA 142 also structurally supports the FPA package 140. The analog electronics on the first PCA 142 interface with and control the FPA 106, and stream raw infrared image data (e.g. 30 Hz) to a DSP mounted on the second PCA 144.

In some embodiments, the second PCA 144 generally contains digital electronic components, including the DSP and the FPGA. The DSP performs computations to convert the raw infrared image data to scene temperatures, and then to RGB colors corresponding to the scene temperatures and selected color palette. For example, U.S. Pat. No. 6,444,983 entitled "Microbolometer Focal Plane Array with Controlled Bias," is incorporated herein in its entirety, discloses such an infrared camera. The DSP then streams the resulting infrared RGB image display data to the FPGA where it is combined with the VL RGB image data and then sends the combined image data to the display 108. The FPGA operates under control of the DSP, which is further controlled by an embedded processor card engine. The FPGA controls the timing and actuation of the shutter 148.

The FPGA, mounted with the digital electronics, receives the output of the magnetic sensor 120 output, which approximates a distance to target input. The FPGA may then correct the parallax error between the infrared and visible light images and register them together before sending the combined imagery data to the camera display, as described in U.S. patent application Ser. No. 11/294,752. A separate PCA may be provided to support the operation of the user interface and the display 108.

Figure 6A:
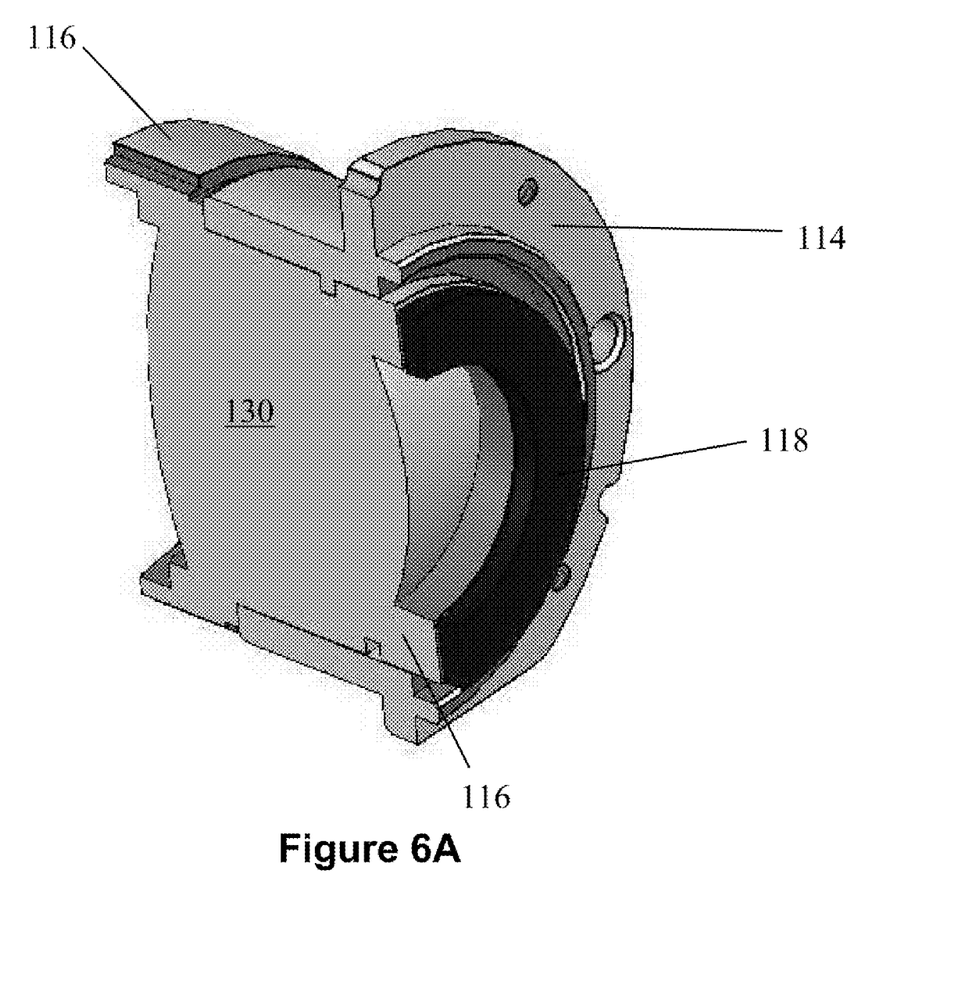
FIG. 6A is a cross-sectional perspective view of the lens assembly taken along line 6-6 of FIG. 4.
Figure 6B:
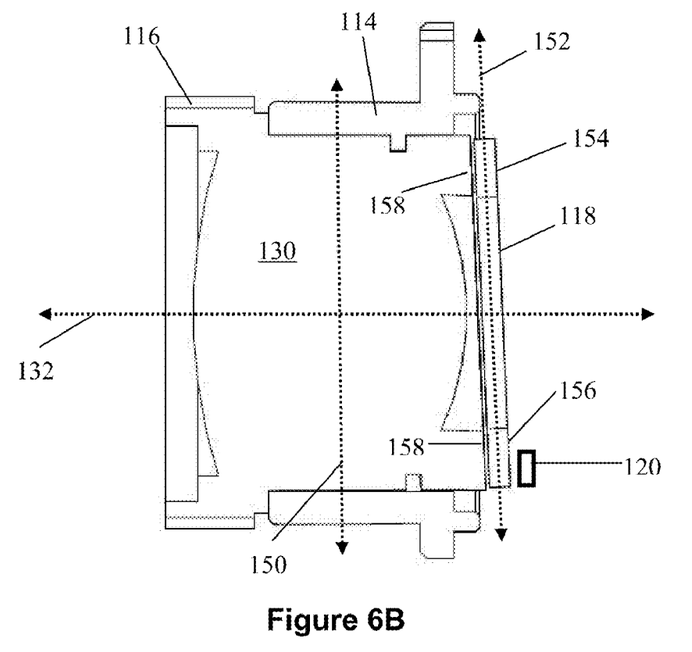
FIG. 6B is a cross-sectional view of the lens assembly taken along line 6-6 of FIG. 4 adjusted to a far focus position.
Figure 6C:
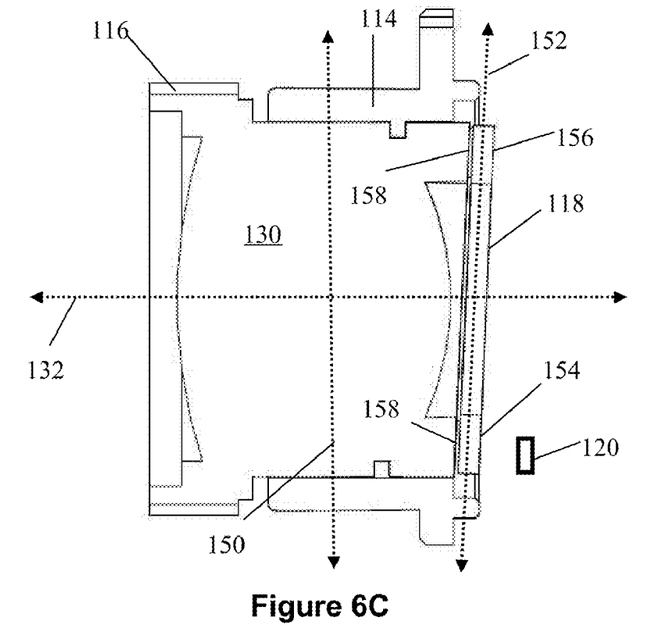
FIG. 6C is a cross-sectional view of the lens assembly taken along line 6-6 of FIG. 4 adjusted to a near focus position.

FIGS. 6A-6C are cross-sectional views of the IR lens assembly taken along line 6-6 of FIG. 4 with the rest of the camera removed for clarity. FIGS. 6A-6C are also representative of the IR camera embodiment shown in FIG. 1. FIGS. 6A-6C show the stationary lens body 114 that supports the rotatable focus ring 116 and lens 130. In the embodiment shown, magnet 118 is a ring that encircles a rear surface of the focus ring 116 facing the FPA. The magnetic sensor 120 is fixed in the camera housing 102 a small distance from of the FPA. Since magnet 118 is attached to the back of focus ring 116, magnet 118 translates axially with focus ring 116 when the IR lens 130 is focused due to the cam action of the lens body. Of course, the focus position could instead be changed by moving the FPA relative to the stationary lens. Magnet 118 works in conjunction with a magnetic sensor 120, such as a Hall effect sensor, to provide the focus position. The magnetic sensor value to focus distance correlation for each infrared lens is determined at the factory and stored with other camera calibration data in the camera's non-volatile memory. As is clear from a comparison of FIGS. 6B and 6C, magnetic sensor 120 is further from magnet 118 in FIG. 6C than in FIG. 6B.

Magnetic sensor 120 is fixed in the housing 102 with respect to FPA 106 to sense the proximity of a magnet 118 attached to the back of the IR lens 130. As the focus of the lens is changed via rotation of focus ring 116, the distance between the magnet 118 and the magnetic sensor 120 changes, resulting in an output from the magnetic sensor 120 that is proportional to focus position. This focus position is used to derive an estimate of the distance to the target. The infrared lens focus position provides an especially convenient estimate of distance because typical infrared lenses have a low F-number, resulting in a shallow depth of field. The magnetic sensor 120 may, in one embodiment, be fixed on the FPA.

FIG. 6B shows the lens 130 adjusted to a far focus position and FIG. 6C shows the lens 130 adjusted to a near focus position. FIGS. 6B and 6C show optical axis 132. The plane 150 of the lens 130 is normal to the optical axis 132. Magnet 118, being a flat ring in the embodiment shown, also defines a plane 152. Other embodiments of magnet may also define a central plane. The central plane may extend centrally between the opposing large faces of the magnet. The magnet plane 152 runs through a first end 154 and an opposing second end 156 of magnet. In certain embodiments, the magnet 118 is designed or mounted such that the magnet plane 152 is not parallel to the lens plane 150. In the embodiment shown, the rear end 158 of focus ring 116 is formed or machined such that magnet plane 152 is not parallel to lens plane 150. Of course, many other methods or structures may be employed to achieve this same non-parallel result. For instance, an angled insert may be positioned between magnet 118 and focus ring 116 in order to set magnet plane 152 at an angle. The insert may be integral with the magnet or the rear of the focus ring, or it could be a separate component.

Figure 7A:
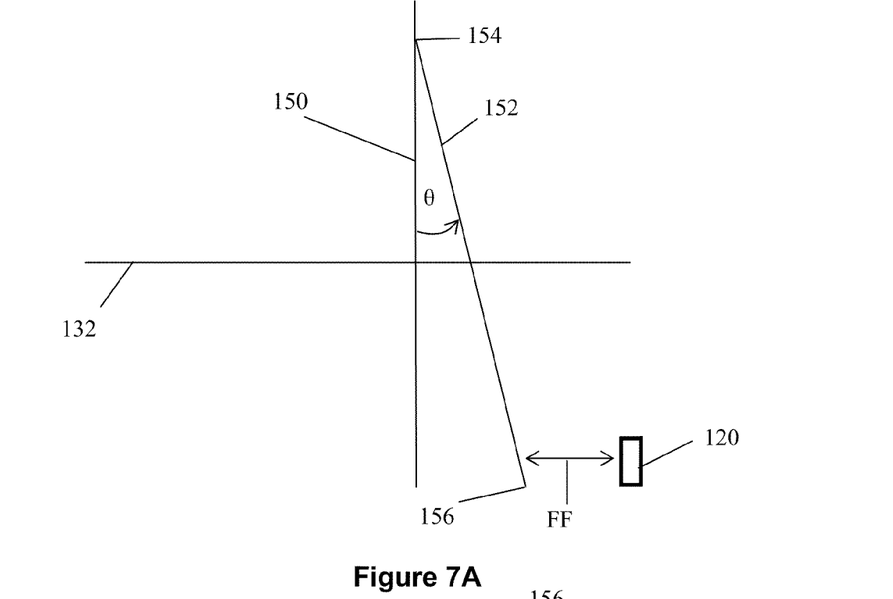
FIG. 7A is a schematic diagram showing the angular relationships between the lens assembly adjusted to a far focus position, the magnet, and the magnetic sensor, according to some embodiments of the invention.
Figure 7B:
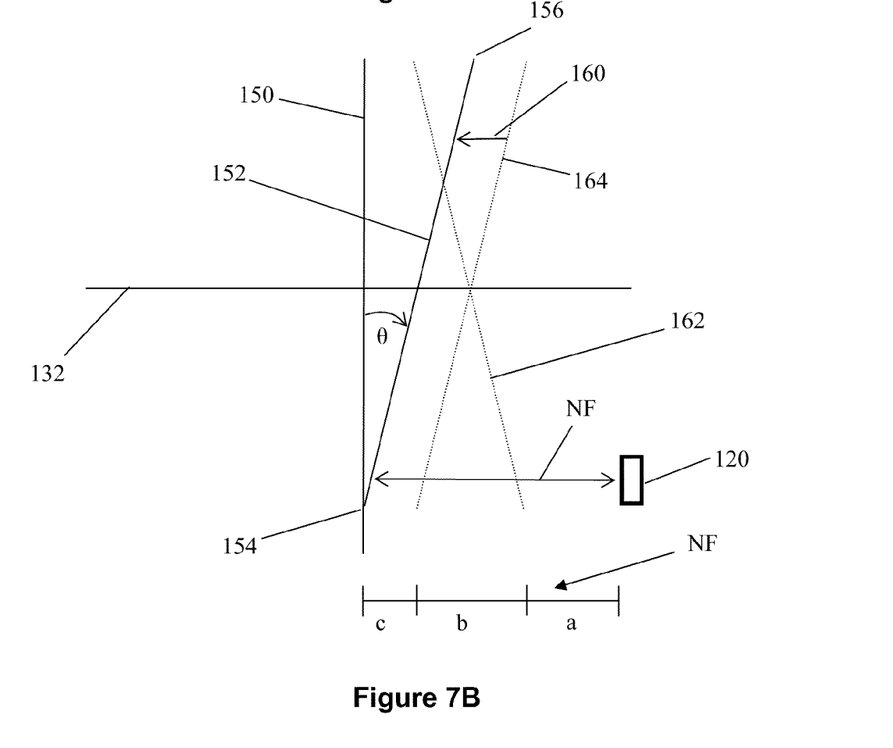
FIG. 7B is a schematic diagram showing the angular relationships between the lens assembly adjusted to a near focus position, the magnet, and the magnetic sensor, according to some embodiments of the invention.

FIGS. 7A and 7B are schematic diagrams showing the angular relationships between the lens assembly, the magnet, and the magnetic sensor, according to some embodiments of the invention. In FIG. 7A, similar to FIG. 6B, the lens assembly is adjusted to a far focus position. In FIG. 7B, similar to FIG. 6C, the lens assembly is adjusted to a near focus position. FIGS. 7A and 7B show schematically the optical axis 132, the plane 150 of the IR lens, which is normal to the optical axis 132, the plane 152 of the magnet, and the first end 154 and the second end 156 of the magnet. From FIGS. 7A and 7B, which are not to scale, it may be seen that the lens plane 150 forms an angle θ with respect to the magnet plane 152. Angle θ remains constant between FIGS. 7A and 7B.

In FIG. 7A, magnetic sensor 120 and magnet 118 are separated by a distance FF. As the focus of the lens is changed via rotation of focus ring, the distance between the magnet 118 and the magnetic sensor 120 increases to distance NF due to the cam action of the lens body. That is, the separation between magnet 118 and magnetic sensor 120 increases to a distance NF as the focus position changes from far focus to near focus. As shown in FIG. 7B, distance NF may be broken down in three distance segments, segment a, segment b, and segment c. Segment a represents the distance FF, which is attributable to the separation between the magnet 118 and magnetic sensor 120 at the far focus position.

Segment c represents the axial translation of magnet 118 (and IR lens) relative to the lens body, which remains stationary, along the optical axis 132 when the IR lens focus position changes from the far field to the near field positions. The axial translation is illustrated in FIG. 7B as a shift 160 of the magnet plane 152 along the optical axis 132 from the magnet plane 152 far field position, shown in FIG. 7A, to the magnet plane 152 near field position, shown in FIG. 7B. Magnet plane 152 far field position, shown in FIG. 7A, is repeated as a first schematic plane 162 in FIG. 7B. A second schematic plane 164 represents the magnet plane 152 rotated into the near field position but in the same axial position as the magnet plane 152 in FIG. 7A in order to illustrate the axial shift 160 equal to segment c distance. The second schematic plane 164 is an unrealistic position shown just for illustration, since the magnet plane 152 rotates about the optical axis 132 as it shifts axially.

In the embodiment shown, magnet 118 rotates about optical axis 132 along with the focus ring. Since magnet 118 is mounted at an angle θ with respect to the lens plane 150, the second end 156 of magnet 118 sits rearward of the first end 154 of magnet 118 (e.g., by about 0.060 inches) during the entire rotation. That is, angle θ remains constant throughout the entire rotation. In the embodiments shown in FIGS. 6 and 7, focus ring 116 rotates through 180 degrees. FIG. 6C shows the focus ring 116 rotated 180 degrees from the position of the focus ring 116 in FIG. 6B. Accordingly, in the cross-sections shown, the magnet 118 forms an angle θ relative to the lens plane 150 in both FIGS. 7A and 7B. In some embodiments, the focus ring 116 does not rotate a full 180 degrees. In such embodiments, the magnet 118 will still form an angle θ relative to the lens plane 150 throughout its more limited rotational movement.

Segment b in FIG. 7B represents the distance between magnet 118 and magnetic sensor 120 attributable to the mere rotation of the angled magnet 118, without accounting for any associated axial shifting of the entire magnet, which is represented as segment c distance. For instance, as shown in FIG. 7B, first schematic plane 162 and second schematic plane 164 are views of the magnet plane 152 rotated about optical axis 132 without any associated axial translation. As is apparent, the distance between magnetic sensor 120 and the respective schematic plane 162, 164 increases by an amount equal to segment b when the first schematic plane 162 is rotated 180 degrees to the second schematic plane 164. Thus, the increased distance between magnetic sensor 120 and the magnet plane 152 due merely to rotation (without accounting for axial translation) is segment b distance. If the rotation of the focus ring is less than the 180 degrees, then the segment b distance will be shorter than that shown in FIG. 7B. However, as the angle θ is increased, the segment b distance also increases.

Accordingly, by tilting the magnet as described above, the distance between the magnetic sensor 120 and the magnet 118 changes due to the axial shift from the cam action of the lens body (segment c distance) and due to the tilt angle (segment b distance). Thus, the tilt angle θ of the magnet functions to amplify the distance between the magnet 118 and the magnetic sensor as the lens focus is adjusted. The amplification improves the resolution of the magnetic sensor since even with small changes in the segment c component of the separation distance (whether by limited rotational change or by limited cam action), embodiments of the present invention provide an additional segment b component. Embodiments of the present invention therefore provide an improved focus position sensor in a compact design even in extreme situations such as where full rotation of the focus ring from far field to near field positions effects little axial translation, where the rotational angle of the focus ring is limited, where the lens assembly is designed to either limit the rotational angle of the focus ring or limit the rotational angular span over which the lens focus is effectively changed.

In one embodiment of the present invention, the axial shift (segment c) for 180 degrees of focus ring rotation is about 0.175 inches. In a second embodiment of the present invention, the axial shift (segment c) for 180 degrees of rotation is about 0.060 inches, which is roughly one-third the first embodiment. In such designs, the 0.060 inches does not provide much axial translation over which to measure the focus position. Accordingly, as segment c distance drops in size, segment b distance becomes a much more useful and important component. In the second embodiment, segment b distance is also set to 0.060 inches via an angle θ equal to 2.55 degrees. Such a design doubles the change in distance between the far field and near field positions, which greatly improves the resolution of the magnetic sensor. Segment a distance may also be set to about 0.005 inches, which provides that doubling the change in distance is roughly equal to doubling the absolute distance. In some designs, segment b distance may be greater than segment c distance. In other designs, segment b distance may be less than segment c distance. The ratio of segments b and c distances may range from 0.5 to 2.0, however other ratios are also useful. Similarly, in some embodiments the angle θ is greater than 2 degrees. In some embodiments, though, the angle θ is greater than 1 degree.

In some embodiments, the lens assembly of the camera may be designed such that the focus changes from its near field focus position (e.g., 6 inches) to its far field focus position (e.g., infinite) over an axial translation less than the entire axial travel between the mechanical stops. That is, even though 180 degrees of rotation may provide a certain axial travel translation (e.g., 0.060 inches), only a portion of the translation (e.g., 0.020 inches) actually adjusts the focus of the lens between its near field and far field positions. In such instances, a limited number (e.g., 60) of the 180 degrees of available rotation changes the lens focus from its near field to far field positions, such that the remaining rotation (e.g., 120 degrees) extends the lens past its near field and far field positions. In such embodiments, the short amount of axial translation (e.g., a segment c distance of 0.020 inches) between near field and far field positions does not provide much axial translation over which to measure the focus position and the amplification (distance b) provided by the tilt angle of the magnet 118 becomes even more useful. Thus, if the ratio of distances b and c is 2.0, then a distance c of 0.020 inches provides an overall change between near field and far field positions of 0.060 inches since the distance b would be 0.040 inches. The remaining axial translation over the full 180 degrees of rotation remains available to account for manufacturing tolerances and temperature changes that cause changes to the optics. Accordingly, in some embodiments of the present invention, the lens position sensor is used in lens assembly designs where the focus changes from it near field to far field focus positions over less than 0.100 inches of axial translation. In some embodiments, the axial translation associated with the near field and far field positions is less than 0.050 inches. In some embodiments, the axial translation associated with the change from near field to far field positions is less than 0.025 inches.

Figure 8A:
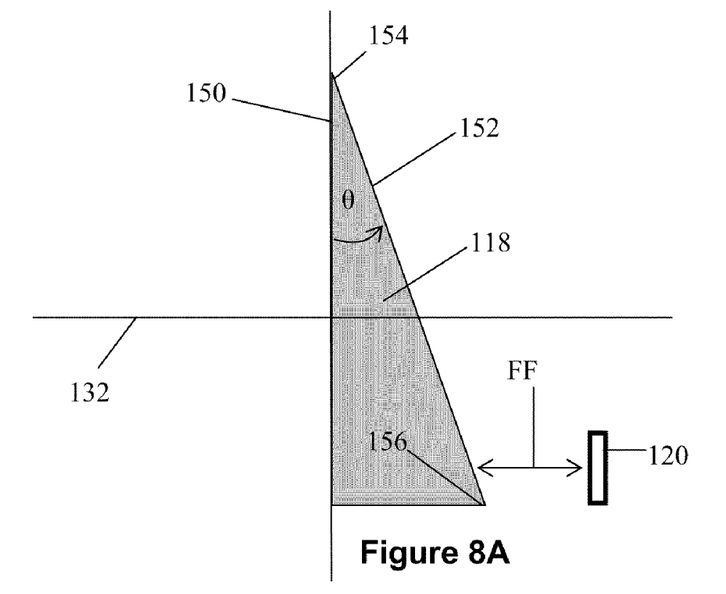
FIG. 8A is a schematic diagram showing the relative positions between the lens assembly adjusted to a far focus position, the magnet, and the magnetic sensor, according to some alternate embodiments of the invention.
Figure 8B:
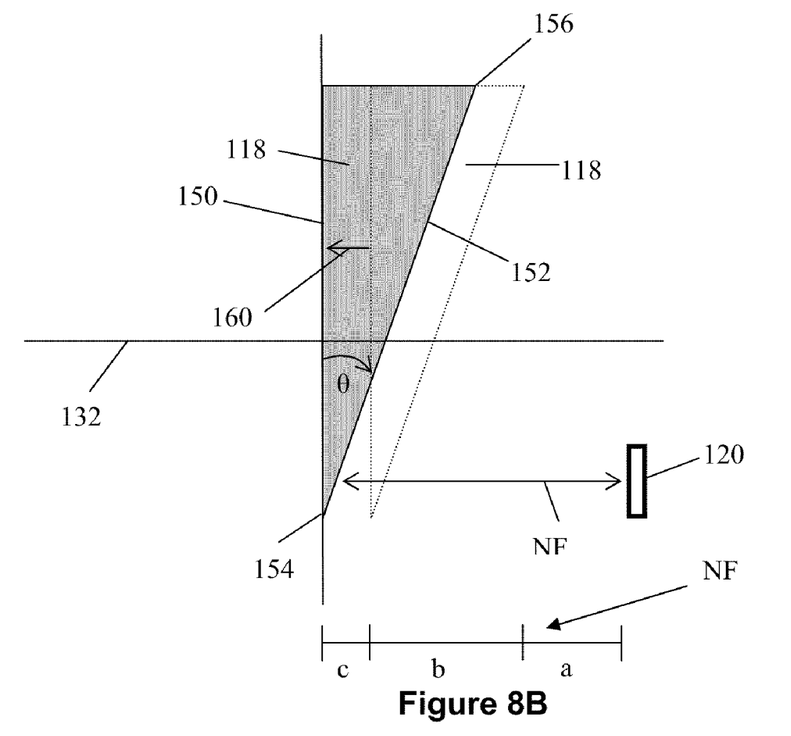
FIG. 8B is a schematic diagram showing the relative positions between the lens assembly adjusted to a near focus position, the magnet, and the magnetic sensor, according to some alternate embodiments of the invention.

FIGS. 8A and 8B schematically show one alternate embodiment of the present invention. In this design, magnet 118 has a non-rectangular cross-section, such as a triangular cross-section shown that provides the angled rear surface. In FIG. 8A, similar to FIG. 7A, the lens assembly is adjusted to a far focus position. In FIG. 8B, similar to FIG. 7B, the lens assembly is adjusted to a near focus position. FIGS. 8A and 8B show schematically the optical axis 132, the plane 150 of the IR lens, which is normal to the optical axis, the plane 152 of the magnet, which is parallel to the rear edge of the magnet in this embodiment, and the first end 154 and the second end 156 of the magnet. From FIGS. 8A and 8B, which are not to scale, it may be seen that the lens plane 150 forms an angle θ with respect to the magnet plane 152. Angle θ remains constant between FIGS. 7A and 7B.

In FIG. 8A, magnetic sensor 120 and the portion of magnet 118 proximate magnetic sensor 120 are separated by a distance FF. As the focus of the lens is changed via rotation of focus ring, the closest distance between the magnet 118 and the magnetic sensor 120 increases to distance NF due to the cam action of the lens body. That is, the portion of magnet 118 proximate magnetic sensor 120 increases to a distance NF as the focus position changes from far focus to near focus. As shown in FIG. 8B, distance NF may be broken down in three distance segments, segment a, segment b, and segment c. Segment a again represents the distance FF, which is attributable to the separation between the magnet 118 and magnetic sensor 120 at the far focus position. Segment c again represents the axial translation of the magnet 118 due to the cam action of the lens body. Similarly, segment b again represents the distance component due to the rotation of magnet 118.

In other embodiments, magnet 118 may have a non-flat front or rear surface. The non-linearities provided by using a magnet with a non-rectangular cross-section or by having a non-flat rear surface can be corrected during calibration. In such magnet designs, better resolution from the magnetic sensor may be obtained if the magnet provides a general increase or decrease in flux when measured at the magnetic sensor due, at least in part, to rotation of the magnet (segment b distance) without accounting for axial translation (segment c distance). Such alternate magnet designs may be seen as having an effective magnet plane that forms an effective tilt angle θ with respect to the lens plane.

In some embodiments, magnet 118 may be "c-shaped" instead of encircling the entire rear surface of the focus ring 116. For instance, if, as described above, the focus ring 116 rotates through only 180 degrees, the "c" or arc defined by the magnet may extend about 180 degrees, or what ever amount roughly equals the extent of the focus ring rotation. In such embodiments, the magnet is positioned such that a portion of the magnet remains adjacent to or in the field of view of the magnet sensor 120 over the entire rotation of the focus ring 116. The remainder of the focus ring 116 (e.g., the other 180 degrees) need not have a corresponding segment of magnet since the remainder of the focus ring 116 is never rotated adjacent to or in the field of view of the magnet sensor. Similarly, if, as described above, only a limited number of the degrees of available rotation (e.g., 60 out of 180) change the lens focus from its near field to far field positions, the magnet could instead define a smaller arc (e.g., 60 degrees to roughly equal the rotation between the far field and near field positions). Again, in such embodiments, the magnet is positioned such that a portion of the magnet remains in the field of view of the magnet sensor 120 over the rotation of the focus ring 116 between the near field and far field positions. The remainder of the focus ring 116 (e.g., the other 120 degrees) need not have a corresponding segment of magnet since the remainder of the focus ring 116 is not rotated adjacent to the magnet sensor during the useful portion of the rotation. In all such embodiments, the "c" shape, of course, may still define a magnet plane in the same fashion as the flat ring magnet described herein.

It should also be understood that the present invention is not limited to the use of magnets and magnetic sensors to function as a position sensor. For instance, many types of stimulators or exciters may serve as sources of a field (e.g., magnetic, inductive, capacitive, electric, etc.) and be paired with a corresponding sensor to function as a lens position sensor. A further description of appropriate position sensors is provided in Fraden, Jacob; Chapter 5—Position, Level and Displacement. In *AIP Handbook of Modern Sensors: Physics, Designs and Applications*, American Institute of Physics, 1993, pp. 264-293, which is incorporated by reference herein. In such case, the field source may encircle all or a portion of the lens or rear of the focus ring, as described above. The "c" shape or "o" shape of the field source could still define a source plane similar to the magnet plane described above.

In the foregoing detailed description, the invention has been described with reference to specific embodiments. However, it may be appreciated that various modifications and changes can be made without departing from the scope of the invention as set forth in the appended claims.

The invention claimed is:

1. An infrared camera with a lens position sensor, comprising:
   a housing;
   a focal plane array (FPA) package mounted within the housing and containing an FPA;
   a lens assembly coupled to the housing and including a rotatable lens, the lens being positioned such that thermal scene data collected by the lens along a central optical axis of the lens is directed onto the FPA, rotation of the lens causing axial shift of the lens relative to the FPA, the central optical axis of the lens defining a lens plane normal thereto;
   a magnet coupled to the lens such that the magnet rotates and shifts axially with the lens, the cross-section of the magnet in the circumferential direction being uniform, the magnet extending within a magnet plane, the magnet plane forming an angle greater than zero with the lens plane; and
   a magnetic sensor mounted within the housing, the magnetic sensor sensing the magnetic flux from the magnet to determine the lens position.

2. The infrared camera of claim 1, wherein the angle is greater than 2 degrees.

3. The infrared camera of claim 1, wherein a surface of the magnet defines the magnet plane.

4. The infrared camera of claim 3, wherein the surface is a surface closest to the FPA package.

5. The infrared camera of claim 1, wherein the magnet has a first surface closest to the FPA and an opposing second surface closest to the lens, the magnet plane extending centrally between the first and second surfaces.

6. The infrared camera of claim 1, wherein the magnetic flux sensed by the magnetic sensor varies with both the axial shift and rotation of the magnet.

7. The infrared camera of claim 6, wherein the variation of the magnet flux sensed by the magnetic sensor based on rotation of the magnet increases as the angle between the magnet and lens planes increases.

8. The infrared camera of claim 6, wherein the lens may be rotated between a far field lens position and a near field lens position, the variation of the magnet flux sensed by the magnetic sensor based on rotation of the magnet between the near field and far field lens positions being greater than or equal to the variation of the magnet flux sensed by the magnetic sensor based on the axial shift of the magnet between the near field and far field lens positions.

9. The infrared camera of claim 1, further including a processor that determines the lens position based on the magnetic flux sensed by the magnetic sensor.

10. The infrared camera of claim 1, further including a visible light sensor.

11. The infrared camera of claim 1, wherein the axial shift of the lens between near field and far field focus positions is less than 0.050 inches.

12. The infrared camera of claim 1, wherein the lens assembly includes a stationary lens body and a rotatable focus ring, the rotatable focus ring supporting the magnet and the lens.

13. The infrared camera of claim 1, wherein the magnetic sensor is a Hall effect sensor.

14. The camera of claim 1, wherein the magnet only partially encircles the lens.

15. A camera with a lens position sensor, comprising:
    a housing;
    a focal plane array mounted within the housing;
    a lens assembly coupled to the housing and including a rotatable lens, the lens being positioned such that scene data collected by the lens along a central optical axis of the lens is directed onto the FPA, rotation of the lens causing axial shift of the lens relative to the FPA, the lens being rotatable between a far field position and a near field position, the central optical axis of the lens defining a lens plane normal thereto;
    a magnet coupled to the lens such that the magnet rotates and shifts axially with the lens, the cross-section of the magnet in the circumferential direction being uniform, the magnet extending within a magnet plane, the magnet plane forming an angle greater than zero with the lens plane; and
    a magnetic sensor mounted within the housing, the magnetic sensor sensing the proximity of the magnet to determine the lens position, the magnet being relatively closer to the magnetic sensor in the far field position than in the near field position, the proximity of the magnet to the magnetic sensor depending in part on the angle between the magnet plane and the lens plane.

16. The camera of claim 15, wherein the magnet is relatively closer to the magnetic sensor in the far field position when a greater angle is used between the magnet plane and the lens plane.

17. The camera of claim 15, wherein the magnet is relatively further from the magnetic sensor in the near field position when a greater angle is used between the magnet plane and the lens plane.

18. The camera of claim 15, wherein the proximity of the magnet to the magnetic sensor varies based on the axial shift and rotation of the magnet.

19. The camera of claim 18, wherein the variation in proximity of the magnet to the magnetic sensor based on the rotation of the magnet between the far field and near field positions is greater than or equal to the variation in proximity of the magnet to the magnetic sensor based on the axial shift of the magnet between the far field and near field positions.

20. The camera of claim 15, wherein the camera is an infrared camera.

21. The camera of claim 15, wherein the lens rotates through 180 degrees and the far field and near field positions are separated by a rotation of the lens of less than 180 degrees.

22. The camera of claim 15, wherein the axial shift of the lens between the near field position and the far field position is less than 0.025 inches.

23. The camera of claim 15, wherein the magnet at least partially encircles the lens.

24. The camera of claim 15, wherein the magnet only partially encircles the lens.

* * * * *